(12) United States Patent
Yamamoto et al.

(10) Patent No.: US 11,654,748 B2
(45) Date of Patent: May 23, 2023

(54) HEATING, VENTILATION, AND AIR CONDITIONING INDICATOR FOR TEMPERATURE AND FAN ADJUSTMENTS AND METHODS THEREOF

(71) Applicant: Honda Motor Co., Ltd., Tokyo (JP)

(72) Inventors: Stuart M. Yamamoto, La Mirada, CA (US); Alen Khoduzadeh, Winnetka, CA (US)

(73) Assignee: Honda Motor Co., Ltd., Tokyo (JP)

( * ) Notice: Subject to any disclaimer, the term of this patent is extended or adjusted under 35 U.S.C. 154(b) by 56 days.

(21) Appl. No.: 17/308,219

(22) Filed: May 5, 2021

(65) Prior Publication Data

US 2022/0355646 A1 Nov. 10, 2022

(51) Int. Cl.
*B60H 1/00* (2006.01)

(52) U.S. Cl.
CPC ....... *B60H 1/00985* (2013.01); *B60H 1/0073* (2019.05); *B60H 1/00807* (2013.01); *B60H 1/00828* (2013.01)

(58) Field of Classification Search
CPC ............. B60H 1/00985; B60H 1/0073; B60H 1/0807; B60H 1/00828
See application file for complete search history.

(56) References Cited

U.S. PATENT DOCUMENTS

| 4,364,428 A * | 12/1982 | Ohtsu | G05D 23/1917 236/94 |
| 6,998,976 B2 | 2/2006 | Kawai et al. | |
| 8,004,507 B2 | 8/2011 | Boudewyns et al. | |
| 8,176,742 B2 | 5/2012 | Choi et al. | |
| 8,188,849 B2 | 5/2012 | Bouchard | |
| 9,037,990 B2 | 5/2015 | Fino et al. | |
| 9,283,827 B2 | 3/2016 | Nishida | |
| 9,746,996 B2 | 8/2017 | Choi et al. | |

(Continued)

FOREIGN PATENT DOCUMENTS

| CN | 107323216 A | 11/2017 |
| CN | 109130781 A | 1/2019 |

(Continued)

*Primary Examiner* — Nelson J Nieves
(74) *Attorney, Agent, or Firm* — Aaron Fong; American Honda Motor Co., Inc.

(57) ABSTRACT

This disclosure describes a system and method for displaying an indicator when temperature and fan adjustments occur which may cause passengers potential discomfort. Discomfort may be caused by deviations of expected air temperature, fan speed, or both. For example, when a desired temperature is set to seventy-two degrees Fahrenheit (72° F.), colder air at sixty degrees Fahrenheit (60° F.) may be used to bring down the temperature within the vehicle which may be at ninety degrees Fahrenheit (90° F.). The temperature difference between the desired temperature of seventy-two degrees Fahrenheit (72° F.) and the incoming air at sixty degrees Fahrenheit (60° F.) may be above a threshold comfort level, such as two degrees Fahrenheit (2° F.). When this happens, the system may provide the indicator to the passengers. Indicators for a fan speed may also be shown when discomfort may exist. Through these indicators, the passengers may recognize that the threshold for comfort has been exceeded.

19 Claims, 12 Drawing Sheets

(56) References Cited

U.S. PATENT DOCUMENTS

| | | | |
|---|---|---|---|
| 10,272,742 B2 | 4/2019 | Chavez Hernandez et al. | |
| 11,390,140 B1* | 7/2022 | Simons | B60H 1/00742 |
| 2003/0052791 A1* | 3/2003 | Reinhardt | B60H 3/0616 |
| | | | 454/158 |
| 2005/0267646 A1* | 12/2005 | Ichishi | G05D 23/27 |
| | | | 165/204 |
| 2006/0042788 A1* | 3/2006 | Naruse | B60H 1/00985 |
| | | | 62/239 |
| 2008/0315000 A1* | 12/2008 | Gorthala | G05D 22/02 |
| | | | 236/94 |
| 2010/0106809 A1* | 4/2010 | Grohman | G05B 19/0428 |
| | | | 709/220 |
| 2010/0274394 A1* | 10/2010 | Wijaya | B60H 1/00985 |
| | | | 180/65.21 |
| 2012/0313958 A1 | 12/2012 | Lee et al. | |
| 2012/0324927 A1* | 12/2012 | Suzuki | B60H 1/3211 |
| | | | 62/126 |
| 2015/0025738 A1* | 1/2015 | Tumas | B60H 1/00742 |
| | | | 701/36 |
| 2016/0131018 A1* | 5/2016 | Kwon | B60H 1/3208 |
| | | | 123/41.15 |
| 2017/0028811 A1* | 2/2017 | Jayasundera | A61B 5/6893 |
| 2017/0120724 A1 | 5/2017 | Furse | |
| 2018/0105023 A1* | 4/2018 | Nakamura | B60H 1/345 |
| 2019/0161068 A1* | 5/2019 | Takeuchi | B60W 20/10 |
| 2019/0315192 A1 | 10/2019 | Smith et al. | |
| 2019/0366799 A1* | 12/2019 | Czerwonka | B60N 2/5678 |
| 2020/0094651 A1* | 3/2020 | Ostrowski | G06N 20/00 |
| 2020/0132352 A1* | 4/2020 | DeLuca | F25B 49/005 |
| 2020/0276878 A1* | 9/2020 | Zhang | B60H 1/00278 |
| 2020/0276881 A1* | 9/2020 | Yu | G05B 13/0275 |
| 2020/0282803 A1* | 9/2020 | Upmanue | B60N 2/879 |
| 2020/0282807 A1* | 9/2020 | Kwon | B60H 1/00985 |
| 2020/0324613 A1* | 10/2020 | Dalia | B60H 1/00742 |
| 2020/0378352 A1* | 12/2020 | Cosgrove | B60H 1/00285 |
| 2021/0048213 A1* | 2/2021 | Albrecht-Buehler | B60K 37/06 |
| 2021/0070145 A1* | 3/2021 | Nitze-Nelson | B60H 1/00985 |
| 2021/0114433 A1* | 4/2021 | Neveu | B60H 1/00828 |
| 2021/0155079 A1* | 5/2021 | Ono | B60K 35/00 |
| 2022/0024280 A1* | 1/2022 | Austin | B60H 1/0073 |

FOREIGN PATENT DOCUMENTS

| | | |
|---|---|---|
| CN | 110744983 A | 2/2020 |
| JP | 5618793 B2 | 11/2014 |
| JP | 5892018 B2 | 3/2016 |
| JP | 2020175816 A | 10/2020 |
| JP | 2020175817 A | 10/2020 |
| KR | 100620060 B1 | 9/2006 |
| KR | 101705121 B1 | 2/2017 |
| WO | 2015025832 A1 | 2/2015 |

* cited by examiner

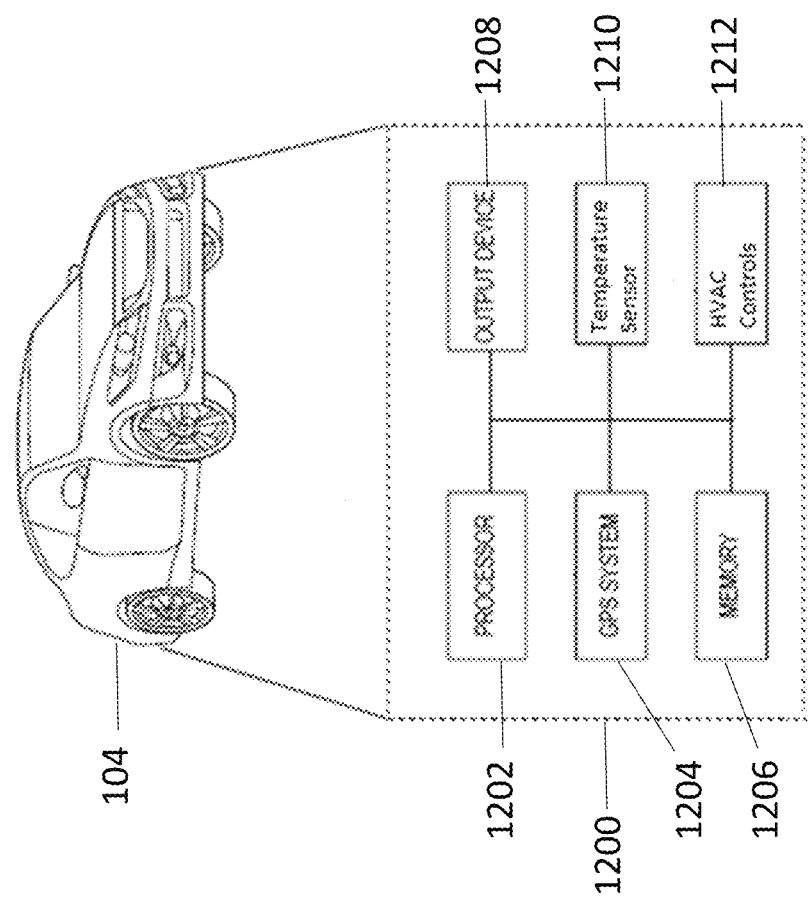

HEATING, VENTILATION, AND AIR CONDITIONING INDICATOR FOR TEMPERATURE AND FAN ADJUSTMENTS AND METHODS THEREOF

BACKGROUND

Heating, ventilation, and air conditioning (HVAC) systems may be used within vehicles. These systems may heat and cool air within the vehicle for the comfort of the vehicle passengers. When a desired temperature is selected for the vehicle, the HVAC systems may pump air at a temperature that is higher or lower than the desired temperature. This may adjust the temperature of the air within the vehicle compartment. In an illustrative example, and when the desired temperature is set to seventy-two degrees Fahrenheit (72° F.), colder air at sixty degrees Fahrenheit (60° F.) may be used to bring down the temperature within the vehicle which is at ninety degrees Fahrenheit (90° F.). The temperature of the air may be adjusted periodically along with fan speeds.

Nevertheless, passenger discomfort may exist when hotter or colder air is pumped in at variable fan speeds. This discomfort may be a result of anticipated versus realized actions. Continuing with the example above, and when the colder sixty degrees Fahrenheit (60° F.) air is being placed into the vehicle compartment, the passengers' feeling of an unexpected temperature differences may cause the discomfort. The present disclosure provides for a HVAC indicator for temperature and fan adjustments and methods thereof that addresses the above identified concerns. Other benefits and advantages will become clear from the disclosure provided herein and those advantages provided are for illustration. The statements in this section merely provide the background related to the present disclosure and does not constitute prior art.

BRIEF DESCRIPTION

This summary is provided to introduce a selection of concepts in a simplified form that are further described below in the DESCRIPTION OF THE DISCLOSURE. This summary is not intended to identify key features of the claimed subject matter, nor is it intended to be used as an aid in determining the scope of the claimed subject matter.

In accordance with one aspect of the present disclosure, a vehicle is provided. The vehicle may include a heating, ventilation, and air conditioning (HVAC) system, a display within the vehicle, at least one processor, and a memory operatively coupled to the processor, the memory storing program instructions that when executed by the processor, causes the processor to perform processes. The processes may include receiving a desired in-vehicle temperature and calculating a difference between a temperature of air brought into the vehicle by the HVAC system and the desired in-vehicle temperature. In addition, the processes may provide an indicator on the display within the vehicle when the difference between the temperature of the air brought into the vehicle by the HVAC system and the desired in-vehicle temperature is above a threshold comfort level, wherein the indicator is a notification that the air brought into the vehicle is above the threshold comfort level.

In accordance with another aspect of the present disclosure, a method for providing an indicator showing a discomfort level for display within a vehicle is provided. The method may include calculating a difference between a desired HVAC attribute and a current in-vehicle attribute. In addition, the method may include providing the indicator showing the discomfort level for display within the vehicle when the difference between the desired HVAC attribute and the current in-vehicle attribute is above a threshold.

In accordance with yet another aspect of present disclosure, a vehicle is provided. The vehicle may include a HVAC system and at least one output device. In addition, the method may include a control system calculating a difference between a temperature of air brought into the vehicle by the HVAC system and a desired in-vehicle temperature. The control system may generate an indicator for the at least one output device within the vehicle when the difference between the temperature of the air brought into the vehicle by the HVAC system and the desired in-vehicle temperature is above a threshold. The indicator may be a notification that the air brought into the vehicle is above the threshold.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing FIGURES are not necessarily drawn to scale and certain FIGURES may be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

FIG. 12 is a schematic diagram of an illustrative computer system for the vehicle for displaying the HVAC indicator in accordance with one aspect of the present disclosure.

DESCRIPTION OF THE DISCLOSURE

The description set forth below in connection with the appended drawings is intended as a description of exemplary embodiments of the disclosure and is not intended to represent the only forms in which the present disclosure may be constructed and/or utilized. The description sets forth the functions and the sequence of blocks for constructing and operating the disclosure in connection with the illustrated embodiments. It is to be understood, however, that the same or equivalent functions and sequences may be accomplished by different embodiments that are also intended to be encompassed within the spirit and scope of this disclosure.

The present disclosure relates to a heating, ventilation, and air conditioning (HVAC) system within a vehicle. More particularly, this disclosure describes a system and method for displaying an indicator when temperature and fan adjustments occur which may cause passengers potential discomfort. Discomfort may be caused by deviations of expected air temperature, fan speed, or both. In an illustrative embodiment, when a desired temperature is set to seventy-two degrees Fahrenheit (72° F.), colder air at sixty degrees Fahrenheit (60° F.) may be used to bring down the temperature within the vehicle which may be at ninety degrees Fahrenheit (90° F.). The temperature difference between the desired temperature of seventy-two degrees Fahrenheit (72° F.) and the incoming air at sixty degrees Fahrenheit (60° F.) may be above a threshold comfort level, such as two degrees Fahrenheit (2° F.). When this happens, the system may provide the indicator to the passengers. Similarly, indicators for a fan speed may also be shown when discomfort may exist. Through these indicators, the passengers may recognize that the threshold for comfort has been exceeded.

Numerous other modifications or configurations to the HVAC indicator for temperature and fan adjustments and methods thereof will become apparent from the description provided below. For example, while the threshold was set to two degrees Fahrenheit (2° F.) above, other thresholds may be used and may be dependent on the passengers themselves. This may be manually set or learned by the system. Advantageously, the passengers of the vehicle may be given warnings when discomfort may be presented through the HVAC system. This discomfort may be psychologically reduced by providing these indicators. Furthermore, the passengers may be given additional information through the indicators and thresholds, that is, the passengers may recognize that the air temperature or fan speed may be within a threshold value if no indicator is shown. Other advantages will become apparent from the description provided below.

Figure 1:
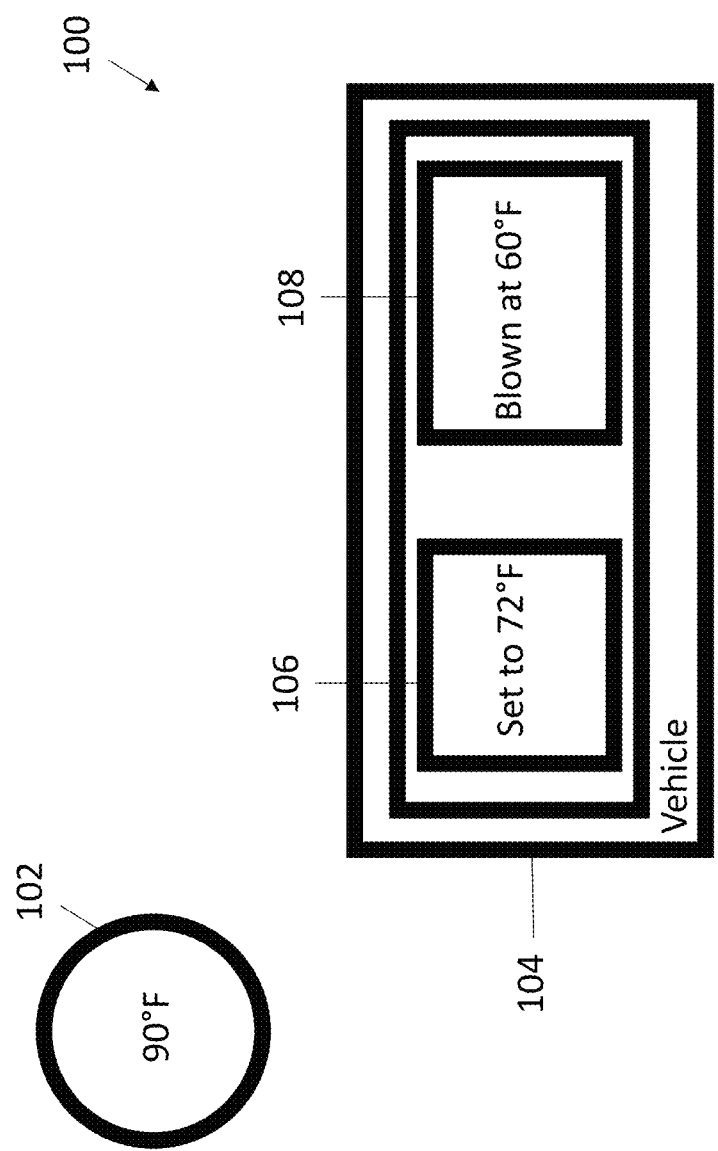
FIG. 1 is a schematic diagram of an illustrative environment for which a heating, ventilation, and air conditioning (HVAC) indicator for temperature and fan adjustments may be used in accordance with one aspect of the present disclosure.

Turning to FIG. 1, a schematic diagram of an illustrative environment 100 for which a HVAC indicator for temperature and fan adjustments may be used in accordance with one aspect of the present disclosure is provided. The temperature in the vehicle 104 may be similar to the outside environment 100 when the vehicle 104 initially starts and the vehicle 104 has been resting for a period of time. In this illustrative example, the ambient temperature 102 may be ninety degrees Fahrenheit (90° F.). As such, the vehicle 104 may have a temperature of ninety degrees Fahrenheit (90° F.) with its passenger compartment.

In the vehicle 104, the passengers may set a temperature of seventy-two degrees Fahrenheit (72° F.) to cool down the vehicle 104. This desired temperature setting 106 may be input through a remote or local device. If remote, a smartphone may be used and an associated application. The local device, such as the display, may receive input for the desired temperature setting 106. The desired temperature setting 106 may be set through a touch interface or physical knob or level, for example. The touch interface may be enhanced or in combination with a graphical user interface (GUI) for allowing the passenger to input their desired temperature setting 106.

The desired temperature setting 106 may be indicative of the intended temperature the passengers wishes to have in the vehicle 104. In one embodiment, this may be learned from the passenger. A particular device associated with the passenger may establish desired temperature settings 106 for that passenger. The passenger, alternatively, may be recognized by a camera using facial recognition software or be identified through biometric sensor to establish the setting 106.

The desired temperature setting 106 may be a function of the day, month and year. For example, the desired temperature setting 106 may vary in the winter and the summer. A higher desired temperature setting 106 of eighty degrees Fahrenheit (80° F.) may be used in the winter while a lower desired temperature setting 106 may be used in the summer such as seventy-two degrees Fahrenheit (72° F.).

While not shown, the vehicle 104 may include a HVAC system. The HVAC system may control air flow and the temperature of the air flow to provide environmental comfort. The HVAC system provides heating and cooling of air dispelled into the vehicle compartment. In one example, air may be heated using the heat from the engine's cooling system. Heat exchangers may also be used to heat and cool the air. Air flow may be controlled through a fan within the vehicle 104, which is tied to the HVAC system.

The HVAC system may provide thermal comfort and improve indoor air quality. Typically, HVAC systems work on the principles of thermodynamics, heat transfer and fluid mechanics. The system may include a fan, a compressor, and ancillaries.

HVAC systems may a heater to warm the air. In one example, the HVAC system may use the heat from hot water in the engine cooling system. The HVAC may also use an evaporator to cool down the air through the evaporation of refrigerant gas. This may the most ideal cabin temperature according to the operation of the instrument panel. A heat exchange may efficiently transfer the heat from one medium to another without having direct contact or without mixing either of them.

A sensor may be provided to determine the air temperature coming out of the HVAC system. This sensor may be placed at the outlet of the HVAC system that enters into the vehicle compartment. The sensors may receive information regarding the blown air 108 that is provided into the vehicle 104. The system described herein may use this information to determine whether discomfort exists among the passengers.

The temperature difference between the desired temperature setting 106 and the blown air 108 into the vehicle 104 may make the passengers within the vehicle 104 feel uncomfortable. For example, if the blown air 108 is at sixty degrees Fahrenheit (60° F.) and the expected air temperature to come in is the desired temperature setting 106 at seventy-two degrees Fahrenheit (72° F.), the passengers psychologically may have a feeling of being uncomfortable. In other words, the difference in temperatures of the desired temperature setting 106 and the blown air 108 may make them feel uncomfortable. The colder air may make the passenger feel much colder than their desired effect.

By providing an indicator, which will be described below, the passenger may realize that the blown air 108 may be colder or hotter than they anticipated from the desired temperature setting 106. Through the indicator, advantageously the passengers may anticipate the incoming colder or hotter air. Through a set threshold, minor variances in the temperature may be discounted or removed when determining whether to provide the indicator.

Figure 2:
FIG. 2 is a schematic diagram of an illustrative console for adjusting HVAC features.

FIG. 2 is a schematic diagram of an illustrative console 200 for adjusting HVAC features. Manual levers were used on the console 200 to adjust to a desired temperature setting. However, this created an uncomfortable feeling when hotter or colder air past a threshold was pushed into the vehicle compartment. For example, when sixty-eight degrees Fahrenheit (68° F.) air is placed into the vehicle compartment but the passenger wishes to have the air coming in at seventy-five degrees Fahrenheit (75° F.), the temperature difference may cause the passenger to have a feeling of discomfort.

Figure 3:
FIG. 3 is a schematic diagram of an illustrative head unit screen for which a HVAC temperature indicator is displayed in accordance with one aspect of the present disclosure.

To remove psychological effects from the colder air (or hotter air in another scenario), an indicator may be provided. FIG. 3 is a schematic diagram of an illustrative head unit screen 300 for which a HVAC temperature indicator 302 is displayed in accordance with one aspect of the present disclosure. The indicator 302 may include the desired temperature setting, which is shown as seventy-two degrees Fahrenheit (72° F.). The indicator 302, as previously discussed, may indicate whether cold or hot air that is above a threshold for a desired temperature setting is being provided into the vehicle compartment. In one example, the threshold amount may be set at two degrees Fahrenheit (2° F.). If the air being blown into the vehicle compartment from the HVAC system is beyond the two degrees Fahrenheit (2° F.) threshold from the desired temperature setting, the indicator 302 may be shown.

The threshold amount may be set by the passengers themselves or may be automatically calculated based on the passengers' behaviors (may use machine learning). An interface may be provided that allows the user to change the threshold. A GUI may allow the passenger to set the threshold.

In a more automated method, passenger feedback may be taken to determine this threshold. For example, biometric sensors may monitor a discomfort level of a passenger. Heat sensors may be used to monitor the discomfort as well. Sensors on a steering wheel may measure tension. Biometric sensors may be used such as electroencephalography (EEG). The threshold value may be set dependent on these types of sensors by noting the level of discomfort and when it occurs. For example, if the user tenses more on the steering wheel when a threshold temperature value of five degrees Fahrenheit (5° F.), then the threshold value may be set at this value.

Internet of Things (JOT) devices may also be used to establish the threshold value. A home cooling/heating system may gather information regarding the user's preferences, desired settings, and threshold values. These homes systems may impart similar settings into the vehicle. In an example, the passenger may have a threshold value set for their home cooling/heat system at five degrees Fahrenheit (5° F.) with a desired temperature setting of seventy-eight degrees Fahrenheit (78° F.). This information may be sent to the vehicle through a wireless or wireline connection.

A threshold value may be determined from the passenger's workplace. For example, if the passenger has their own individual office with an individualized thermostat, this information may be used to set the desired temperature setting as well as threshold value.

Continuing with FIG. 3, the indicator 302 may be laid on top of an application 304. As shown, the application 304 may help the passenger with navigation. The application 304 may be executed through an operating system for the head unit, the operating system controlling resources for a vehicle computing system. The application 304 may also be part of another application such as Android Auto and/or Apple CarPlay. Other applications 304 the indicator 302 may be laid atop of include music applications, maintenance applications, or the like.

In addition to the head unit, the indicator 302 may be placed within other output devices on the vehicle. For example, the indicator 302 may be placed in front of the driver within an instrument cluster of the vehicle. The indicator 302 may also be displayed within a rear entertainment system (RES).

The indicator 302 may be provided through audio or haptic component. For example, specific sound files may be executed when the temperature is beyond a threshold or a passenger's seat may vibrate. The sound file may provide, for instance, "Cooling down to seventy-two degrees Fahrenheit (72° F.)."

Furthermore, while the indicator 302 is shown as oblong box, other types of indicators 302 may be provided. Shapes such as circles, rectangles, stars, and the like may be used. The indicators 302 may be shown flashing when the blown air into the vehicle is outside the threshold value. The indicator 302 may move from side to side on the screen 300.

Figure 4:
FIG. 4 is a schematic diagram of the illustrative head unit screen for which another HVAC temperature indicator is displayed in accordance with one aspect of the present disclosure.

FIG. 4 is a schematic diagram of the illustrative head unit screen 300 for which another HVAC temperature indicator 402 is displayed in accordance with one aspect of the present disclosure. The indicator 402 may be shown on an application 306 as discussed above or may itself be displayed elsewhere within the vehicle. In the example, the indicator 402 may be provided on the screen 300 when the threshold for hot incoming air is above a threshold value.

For example, heating up the vehicle to seventy-two degrees Fahrenheit (72° F.) may be done by blowing air into the vehicle compartment at eighty degrees Fahrenheit (80° F.). The threshold value may be two degrees Fahrenheit (2° F.), for example. As such, the indicator 402 would be shown and overlayed atop the application 304 as the eighty degrees Fahrenheit (80° F.) air coming into the vehicle is above the desired temperature setting.

The indicator 402 may be provided to similar embodiments described above. That is, the indicator 402 may be shown in an oblong pop-up, or it may flash, move, or the like. Advantageously, and through the display of the indicators, discomfort from air blowing into the vehicle compartment at a temperature that is above a threshold value may be recognized by the passenger and may provide comfort to that passenger.

Figure 5:
FIG. 5 is a schematic diagram of the illustrative head unit screen for which HVAC temperature indicators are displayed in accordance with one aspect of the present disclosure.

FIG. 5 is a schematic diagram of the illustrative head unit screen 300 for which HVAC temperature indicators 502 and 504 are displayed in accordance with one aspect of the present disclosure. The screen 300 may show different indicators 502 or 504 simultaneously and which are associated to various passengers within the vehicle. In this particular screen 300, the indicators 502 and 504 are shown for the driver and passenger of the vehicle. A rear indicator may also be provided, which has not been shown. The rear indicator may be displayed on the RES.

The driver side indicator 502 may be provided and separate from the passenger side indicator 504. In one example, the driver may set their desired setting temperature to seventy-two degrees Fahrenheit (72° F.) while the front passenger may set their desired temperature setting to seventy degrees Fahrenheit (70° F.). The threshold values for both may vary and do not have to be the same. As traditional HVAC systems have the ability to send varying air temperatures to each the driver, front passenger, and rear passengers, each of the indicators for them may be shown dependent on the threshold value for the individual and the desired temperature settings.

Continuing with the example above, when the temperature of the air blown from the driver side and passenger side is beyond a threshold of each of their desired temperature settings, both indicators 502 and 504 may be displayed. The temperature of the air blown into each space occupied may be measured and the appropriate calculations may be made. For instance, the driver indicator 502 may be displayed if the blown air temperature is seventy degrees Fahrenheit (70° F.) or below and the desired temperature setting for the driver is seventy-two degrees Fahrenheit (72° F.) with a threshold value of one degree Fahrenheit (1° F.).

The front passenger indicator 504 may be shown, for example, if the temperature of the air blown into the front passenger side is above a threshold value. For example, the desired temperature setting for the passenger may be seventy degrees Fahrenheit (70° F.) with a threshold value of two degrees Fahrenheit (2° F.). If the air blown into vehicle compartment for the passenger is sixty-seven degrees Fahrenheit (67° F.) or below, the indicator 504 may be displayed. Accordingly, the driver and passengers may have separate indicators 502 and 504 with each depending on the user's particular desired temperature settings and threshold values.

Figure 6:
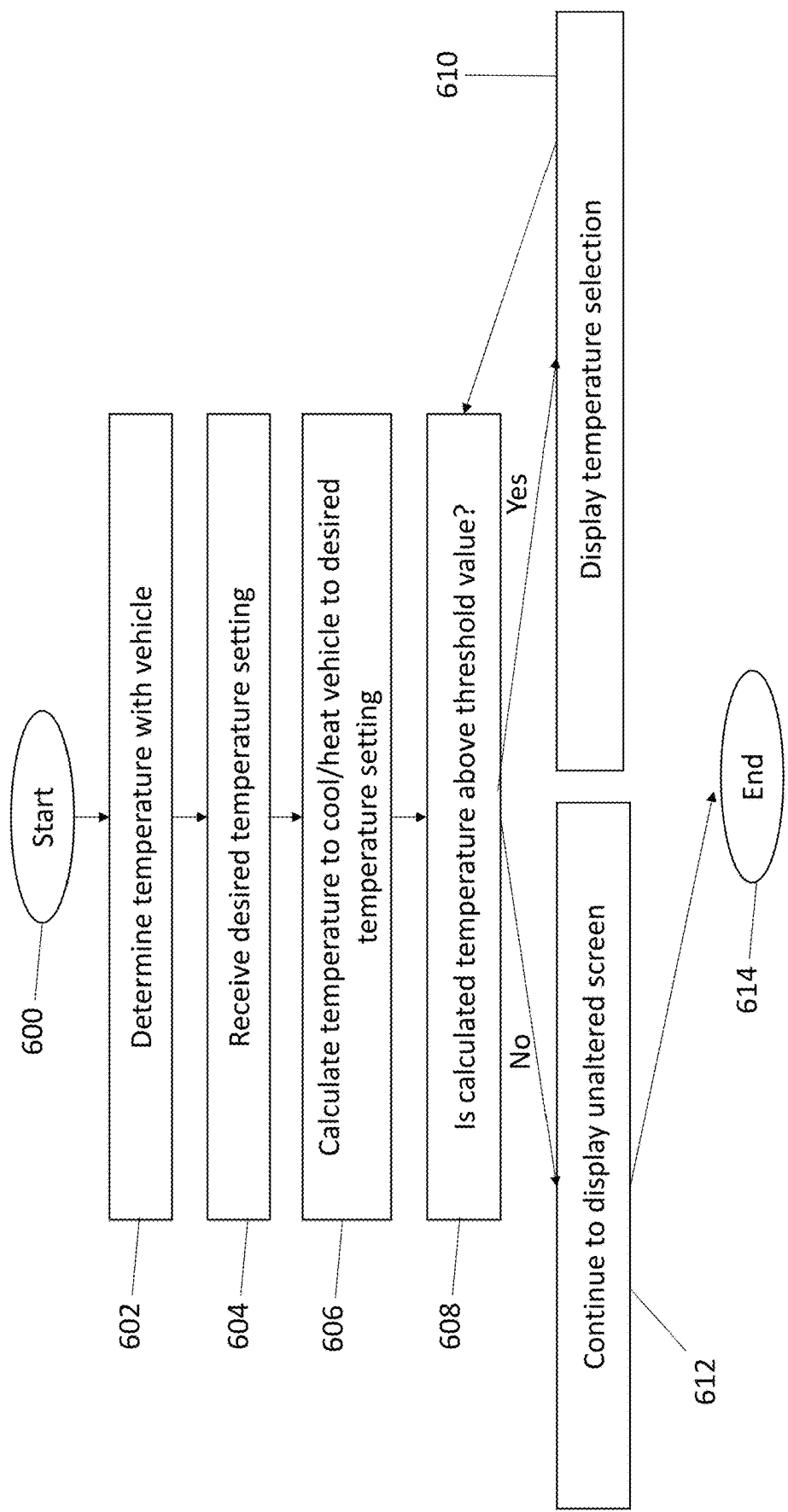
FIG. 6 is a schematic diagram of an illustrative process for displaying the HVAC indicator in accordance with one aspect of the present disclosure.

With reference to FIG. 6, a schematic diagram of an illustrative process for displaying the HVAC indicator in accordance with one aspect of the present disclosure is provided. These processes are exemplary and should not be construed as limiting. Fewer or more processes may be used for displaying the HVAC indicator. The processes may begin at block 600.

At block 602, the system may determine the temperature within the vehicle. This temperature may be used to determine how much air flow and at what temperature would be provided into the vehicle. At block 604, a desired temperature setting is received. This may be input by the user on the display or other input device. As shown above, the desired temperature setting may be learned or may be manually set.

At block 606, an airflow temperature may be calculated to cool or heat the vehicle to the desired temperature setting. Typically, the temperature of the air that the HVAC system may blow into the compartment of the vehicle may be lower or higher than the desired temperature settings. The larger the temperature difference of the air coming into the compartment, however, the more uncomfortable the user may feel. By providing the indicators described above, the passengers may be on notice of the uncomfortable feeling and thus, prepare themselves for it.

In an illustrative example, when the desired temperature setting is at seventy-two degrees Fahrenheit (72° F.) and the temperature inside the vehicle is ninety degrees Fahrenheit (90° F.), the HVAC system may calculate a temperature of airflow into the vehicle to be sixty degrees Fahrenheit (60° F.). By using cooler air than the desired temperature setting, the temperature within the vehicle may be reduced in a quicker amount of time. Due to this difference, however, the cooler airflow may make the passenger uncomfortable, which the indicator may be used to reduce.

At decision block 608, a determination is made as to whether the temperature of the air provided from the HVAC system is above a threshold value, as compared to the desired temperature setting. The indicators may be displayed only when the calculated temperature is above the threshold value of the desired temperature settings, which is at block 610. In the illustrative example above, the threshold may be set to two degrees Fahrenheit (2° F.). If the air temperature coming from the HVAC system is seventy degrees Fahrenheit (70° F.) and the desired temperature setting is seventy-four degrees Fahrenheit (74° F.), the threshold is met, and the indicator would be displayed.

As previously described, the indicator may provide the desired temperature selection. By showing this indicator, the passengers may recognize that the incoming air is outside the threshold and be at ease. Recognition of the indicator may provide a comfort level where the passengers recognize that the incoming air is not at the desired temperature selection.

The incoming air temperature may be continuously calculated against the desired temperature selection, with the indicator being displayed until the temperature of the incoming air is within the threshold value. This may be checked at decision block 608. When the calculated temperature of the incoming air from the HVAC system is within the threshold, at block 612, the screen may be unaltered and not show the indicator. The processes may end at block 614.

Figure 7:
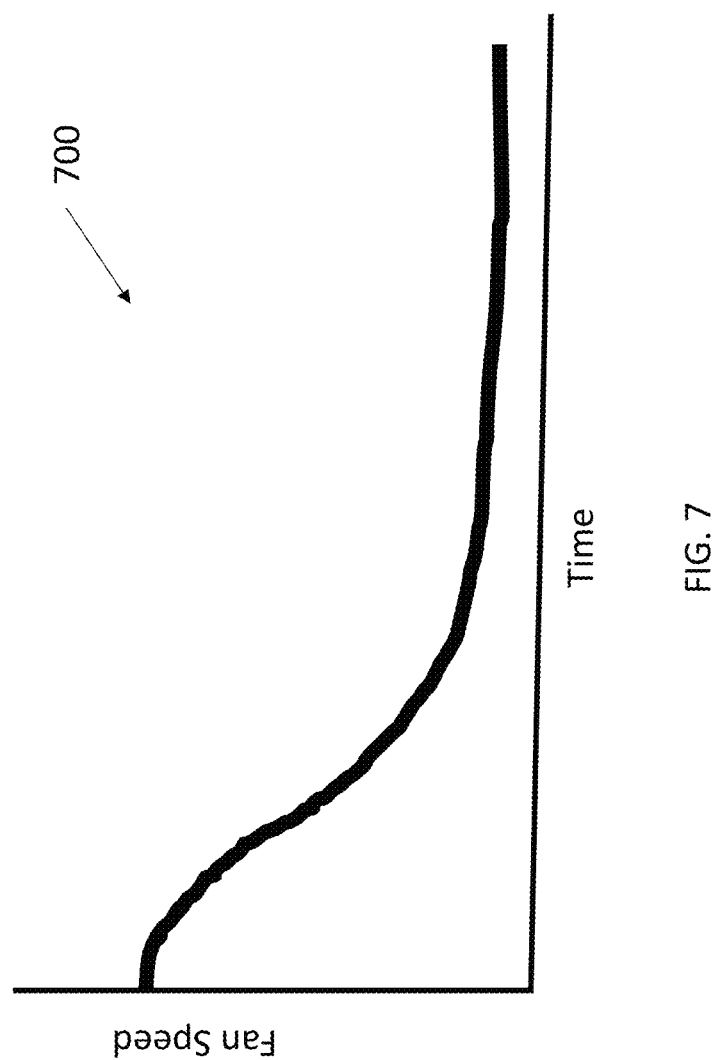
FIG. 7 is a schematic diagram of an illustrative chart showing fan speed for the vehicle as a function of time in accordance with one aspect of the present disclosure.

While incoming air temperature blown from the HVAC system may provide discomfort, fan speed may as well. FIG. 7 is a schematic diagram of an illustrative chart 700 showing fan speed for the vehicle as a function of time in accordance with one aspect of the present disclosure. The fan speed of the vehicle may initially be set on high to cool or heat the vehicle rapidly. This may rush air into the compartment initially such that it may bring the temperature of the cabin to the desired temperature setting quicker.

After an initial cool or heat phase, where the fan is set at a maximum speed, the fan speed may be reduced. As the temperature starts to increase or decrease, the fan speed may begin to dissipate to a slower speed. The user may at a certain threshold be more comfortable with a fan speed. In this typical configuration, if the fan speed deviates outside a threshold, an indicator may be provided. The fan speed may deviate if an auto fan function is on. In the auto fan function, the fan may be adjusted dynamically based on temperature readings. For example, if the door is open the fan settings may be increased due to the temperature fluctuations. The fan speed may be increased and if the fan has been increased above a threshold, then an indicator may be displayed. Advantageously and providing the fan indicator, the uncomfortable feeling created by the fan when it is being blown above a comfortable threshold value may be removed.

Fan settings may be set at different levels. For example, the fan setting may range from zero (0) to ten (10) with the lowest indicating that the fan has been turned off while the highest being the maximum fan speed. Through this, the fan speed or levels may be monitored and when it is set at above threshold value, the indicator may be displayed. In one example, which will be described in more details below, the threshold may be set at two (2), meaning if the desired fan speed were set at three (3) and the fan speed is at one (1), the indicator would be shown and if the fan speed were at two (2), it would not be.

Figure 8:
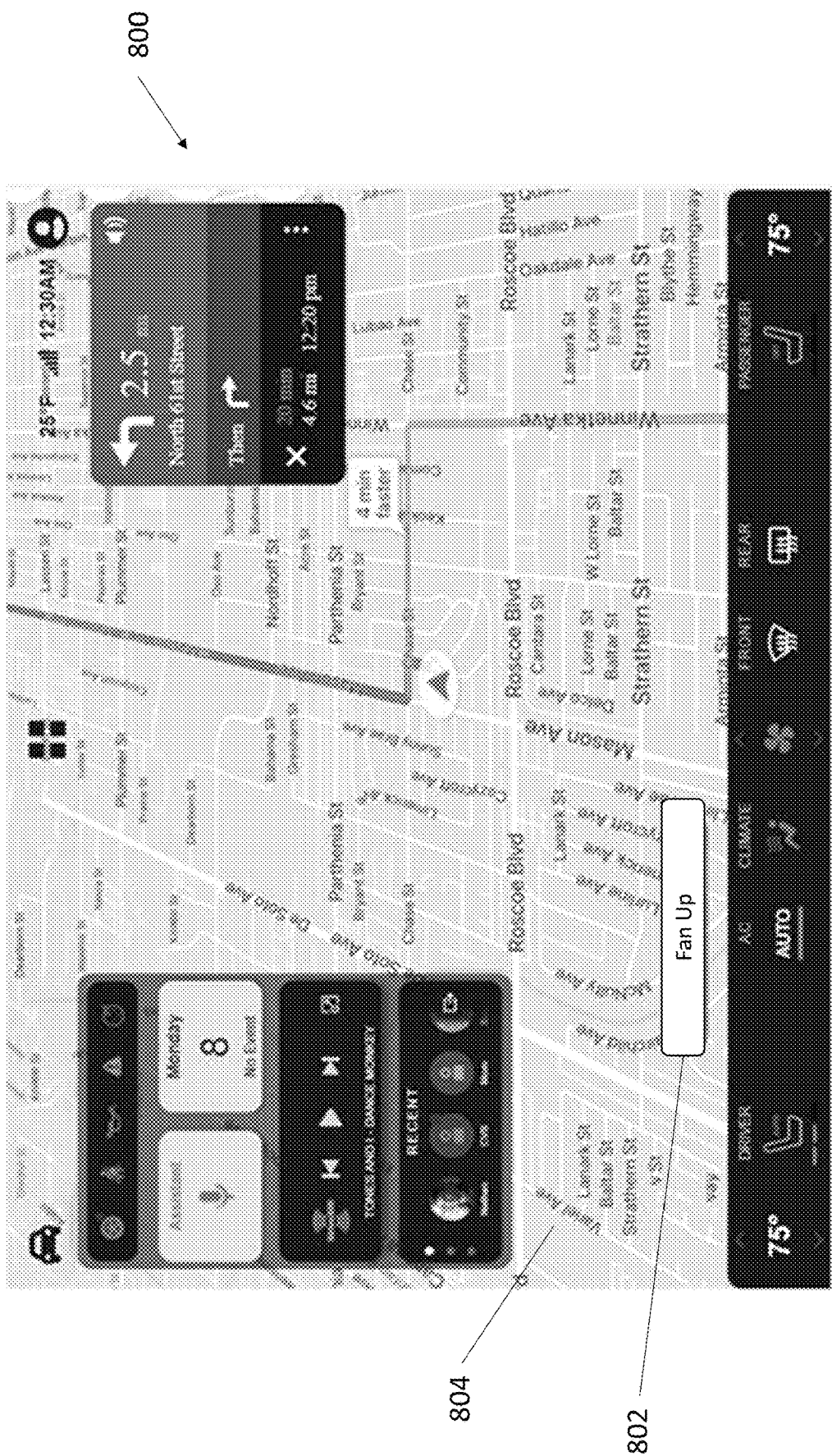
FIG. 8 is a schematic diagram of an illustrative head unit screen for which a HVAC fan indicator is displayed in accordance with one aspect of the present disclosure.

Turning to FIG. 8, a schematic diagram of an illustrative head unit screen 800 for which a HVAC fan indicator is displayed in accordance with one aspect of the present disclosure is provided. The indicator 802 may be overlaid on an application 804. In the shown embodiment, the application 804 may take the form of a navigation application. The application may run atop an operating system for a head unit. The application may also run atop another application such as Android Auto and/or Apple CarPlay. Other applications the indicator 802 may be overlaid on include music applications, maintenance applications, or the like that are typically running on the head unit.

The fan indicator 802 may be displayed when the fan speed is above a threshold value. This value may be determined based on a learned setting. For example, and as described above, the learned setting may follow the curve in the chart. If the fan speed deviates outside that curve beyond a threshold value, then the fan speed indicator 802 may be shown on top of the application 804. The fan speed may change in an auto HVAC function such as when the door opens, or the user may manually change the fan to deviate outside the curve presented above. Through the indicator 802, the passenger may recognize that the fan speed is outside the normal and this may be causing their uncomfortable feeling. The distinction between the threshold is that the user may not noticeably feel the discomfort level if the fan speed is within the threshold value.

As shown, the indicator 802 provided that the fan was up meaning that the fan was getting set above the desired selected fan speed and the threshold. The fan speed was previously too low, and the fan speed has increased above a threshold that would make the user feel uncomfortable. For example, if the desired fan speed is four (4) and the threshold is two (2), the fan speed at seven (7) or above may prompt the indicator 802 to be shown.

Figure 9:
FIG. 9 is a schematic diagram of the illustrative head unit screen for which another HVAC fan indicator is displayed in accordance with one aspect of the present disclosure.

FIG. 9 is a schematic diagram of the illustrative head unit screen 800 for which another HVAC fan indicator 902 is displayed in accordance with one aspect of the present disclosure. In this screen 800, the indicator 902 shows that the fan is down. This may indicate that the fan speed is too low outside their desired fan speed setting and the threshold. The low speed setting may make the user feel uncomfortable. For example, if the desired fan speed is five (5) and the threshold is three (3), the fan speed may be at a two (2) or below and the indicator 902 would be displayed.

Figure 10:
FIG. 10 is a schematic diagram of the illustrative head unit screen for which HVAC fan indicators are displayed in accordance with one aspect of the present disclosure.

FIG. 10 is a schematic diagram of the illustrative head unit screen 800 for which HVAC fan indicators 1002 and 1004 are displayed in accordance with one aspect of the present disclosure. This screen 800 may indicate that different fan settings may be applied to different passengers within the vehicle and that each passenger may have their own threshold value for showing the indicators 1002 and 1004. While a rear passenger indicator is not shown, similar arraignment may be provided which will be described below.

As provided, the indicators 1002 and 1004 may show that the fan speed is down. This may indicate that the fan speed is below a threshold for a desired fan setting. For example, the driver side indicator 1002 may be shown when the fan setting is at two (2) and the desired fan setting is at four (4) with a threshold of one (1). The passenger side indicator 1004 may be shown when the fan setting is at one (1) and the desired fan setting is at five (5) with a threshold of three (3). Different thresholds may thus be used for different passengers in the vehicle. Further, the desired fan settings may be differentiated for each passenger.

Figure 11:
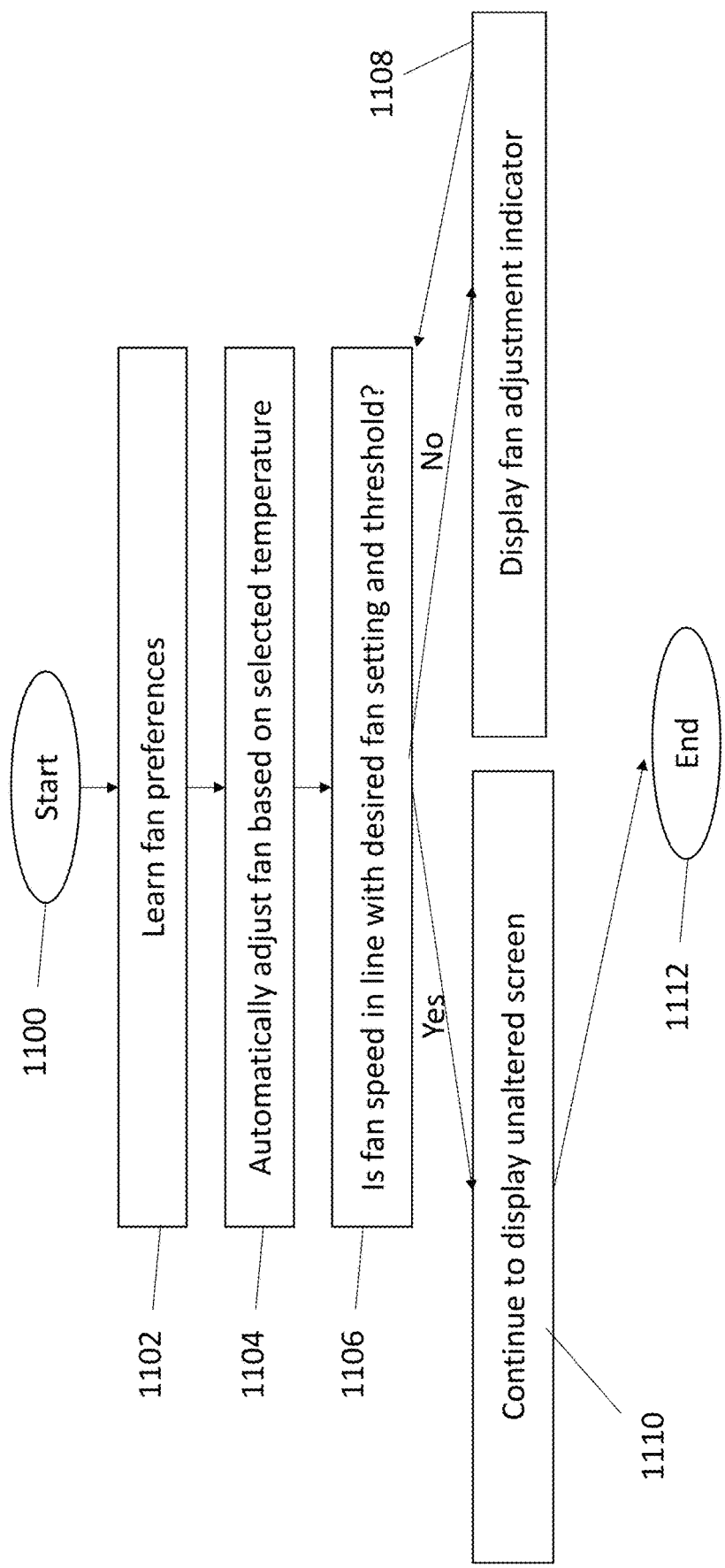
FIG. 11 is a schematic diagram of an illustrative process for displaying the HVAC fan indicator in accordance with one aspect of the present disclosure.

With reference to FIG. 11, a schematic diagram of an illustrative process for displaying the HVAC fan indicator in accordance with one aspect of the present disclosure is provided. These processes are exemplary and should not be construed as limiting. Fewer or more processes may be used for displaying the fan speed indicator. The processes may begin at block 1100.

At block 1102, the fan preferences of the passengers may be learned. This may be done through automated methods or manual methods, and within the vehicle, such as on a computing system, or outside of the vehicle. The preferences may be learned from previous activities. The preferences may be associated with the user through a device they bring in the vehicle. The preferences may also be established through in-vehicle biometric devices, or the like. The user may simply provide in formation through the telematics system which would identify them.

At block 1104, the fan may be automatically adjusted based on selected temperatures. Initially the fan may be set at a maximum level. Afterwards, the fan may be adjusted depending on the deviations of the temperature within the vehicle compartment. Accordingly, the fan and temperature may be integrated into one another.

At decision block 1106, a determination is made on whether the current fan speed is in line with the desired fan setting and threshold value. The desired fan setting may be set through learned preferences, for example, as shown above in the chart. Alternatively, the fan settings may be established manually by the passenger.

When the fan speed is above the threshold and the desired fan setting, at block 1108, the indicator may be shown. In an illustrative example, when the learned preference for the fan speed is set at a level four (4) and the threshold for this particular passenger may be one (1), and the fan speed is two (2) or below or six (6) and above, the fan speed indicator may be displayed. Advantageously, this would indicate to the user that the current fan speed is outside of their preferred comfortability.

The current fan speed may be continuously checked and compared against the desired fan setting. In an example, the fan speed may be within the desired fan setting and threshold and therefore the indicator would not be displayed. Afterwards, the fan speed may be outside the desired fan setting and threshold and thus display the indicator. As such, a loop structure may be created which has not been shown that allows for continuous checks.

At block 1110, and when the fan speed is within the threshold of the desired fan setting, the indicator is not shown, and the screen is unaltered. Through the processes described, the fan indicator may turn on and off depending on the current fan speed and the relationship with the threshold and the desired fan setting. The processes may end at block 1112.

While the temperature and fan indicators were shown separately from one another, they may be shown in combination with one another in a single indicator, or multiple indicators. The indicators may take on a variety of shapes and forms and may be integrated into applications whereby the indicators run atop the applications. The indicators may be shown on the head unit or instrument clusters, HUDs and the like.

FIG. 12 is a schematic diagram of an illustrative computer system 1200 for the vehicle 104 for displaying the HVAC indicator in accordance with one aspect of the present disclosure. The HVAC indicator may be the temperature indicator, fan indicator, or both. The computer system 1200 may reside within the vehicle 104 or alternatively, be inside a user device, for example, a smartphone. The components of the computer system 1200, as well as the components of other systems, hardware architectures and software architectures discussed herein, may be combined, omitted or organized into different architectures for various implementations. However, the example embodiments of the disclosure discussed herein focus on the vehicle environment, with corresponding system components and related methods.

As shown, the computer system 1200 may include internal processing memory 1206, an interface circuit, and bus lines for transferring data, sending commands, and communicating with the vehicle systems. Generally, the system 1200 may include a processor 1202 and memory 1206. The vehicle 104 may also include a bus for sending data internally between the various components of the computer system 1200.

The memory 1206 may generally include both volatile memory such as RAM and non-volatile memory such as ROM, flash memory or the like. The non-volatile portion of the memory 1206 may be used to store persistent information which should not be lost when the vehicle 104 is powered down. To implement logic residing on the memory 1206, the computer system 1200 may include at least one processor 1202. The processor 1202 may implement instructions within the memory 1206 for executing processes. For example, these processes may include detecting temperature differences between a desired temperature setting and the temperature of air blown into the compartment of the vehicle 104, or fan speed that deviates from a learned desired fan setting. The memory 1206, as well as the processor 1202, may be local to the computer system 1200 on the vehicle 104, or remote therefrom.

The vehicle 104 may include a vehicle GPS system 1204 to provide GPS data. Furthermore, the computer system 1200 may include an output device 1208. The output device 1208 may be used for providing or displaying the indicators. The output device 1208 may include any device suitable for showing the indicators as described above. This may include a HUD, a hologram projection system, a liquid crystal display (LCD) or the like.

The vehicle 104 may include a temperature sensor 1210. The temperature sensor may be connected to the computer system 1200. This temperature sensor 1210 may detect the temperature within the vehicle. The HVAC system may use this to determine whether cold or hot air should be sent into the vehicle compartment. The HVAC system may use a fan to control the amount of air being blown into the vehicle compartment and at what temperature.

Information from the temperature sensor 1210 may be used by the processor 1202 and in combination with instructions stored in memory 1206 to determine what type of air should be sent into the cabin and how much. This information may be sent to HVAC controls 1212. The HVAC controls 1212 may adjust the temperature of the vehicle cabin by sending cold or hot into the vehicle and how much, depending on the desired settings regarding the fan speed and the temperature settings.

The foregoing description is provided to enable any person skilled in the relevant art to practice the various embodiments described herein. Various modifications to these embodiments will be readily apparent to those skilled in the relevant art and generic principles defined herein may be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A vehicle comprising:
a heating, ventilation, and air conditioning (HVAC) system; a display within the vehicle;
at least one processor; and
a memory operatively coupled to the processor, the memory storing program instructions that when executed by the processor, causes the processor to:
receive a desired in-vehicle temperature;
calculate a difference between a temperature of air brought into the vehicle by the HVAC system and the desired in-vehicle temperature;
provide an indicator on the display within the vehicle when the difference between the temperature of the air brought into the vehicle by the HVAC system and the desired in-vehicle temperature is above a threshold comfort level, wherein the indicator is a notification that the air brought into the vehicle is above the threshold comfort level, and wherein the indicator is removed from the display when the temperature difference is below the threshold comfort level.

2. The vehicle of claim 1, wherein the desired in-vehicle temperature comprises a driver, front passenger, and rear passengers desired temperature settings.

3. The vehicle of claim 2, wherein the memory storing program instructions that when executed by the processor, causes the processor to calculate temperature differences for the driver, front passenger, and rear passengers desired temperature settings and provide indicators for them on at least one display.

4. The vehicle of claim 1, wherein receiving the desired in-vehicle temperature is input into the display within the vehicle.

5. The vehicle of claim 1, wherein calculating the difference between the air brought into the vehicle through the HVAC system and the desired in-vehicle temperature comprises receiving a temperature reading directly from the HVAC system.

6. The vehicle of claim 1, wherein the indicator shows the desired in-vehicle temperature and is overlaid atop a running application on the display within the vehicle.

7. The vehicle of claim 1 wherein the indicator is flashing.

8. The vehicle of claim 1 wherein the indicator provides at least one of the temperature the air brought into the vehicle by the HVAC system and the difference between the temperature of the air brought into the vehicle by the HVAC system.

9. The vehicle of claim 1, wherein the indicator shows a level of comfortability, wherein the greater the difference between the temperature of the air brought into the vehicle by the HVAC system and the desired in-vehicle temperature, a lower level of comfortability.

10. The vehicle of claim 1, wherein the memory storing program instructions that when executed by the processor, causes the processor to continuously monitor the difference between the air brought into the vehicle through the HVAC system and the desired in-vehicle temperature.

11. A vehicle comprising:
a heating, ventilation, and air conditioning (HVAC) system; at least one output device, implemented via a processor; and
a control system, implemented via the processor, calculating a difference between a temperature of air brought into the vehicle by the HVAC system and a desired in-vehicle temperature, the control system generating an indicator for the at least one output device within the vehicle when the difference between the temperature of the air brought into the vehicle by the HVAC system and the desired in-vehicle temperature is above a threshold, wherein the indicator is a notification that the air brought into the vehicle is above the threshold, and wherein the indicator is removed from the display when the temperature difference is below the threshold comfort level.

12. The vehicle of claim 11, wherein the at least one output device is a head unit or instrument cluster within the vehicle.

13. The vehicle of claim 11, wherein the HVAC system comprises a fan for adjusting the air brought into the vehicle.

14. The vehicle of claim 13, wherein the control system calculates a difference between a learned fan speed and a current speed, the control system generating a second indicator for the at least one output device within the vehicle when the difference between the learned fan speed and the current speed is above a second threshold, wherein the second indicator is a second notification that the fan speed is above the threshold.

15. A method for providing an indicator showing a discomfort level for display within a vehicle, the method comprising:

calculating a difference between a desired heating, ventilation, and air conditioning (HVAC) attribute and a current in-vehicle attribute; and providing the indicator showing the discomfort level for display within the vehicle when the difference between the desired HVAC attribute and the current in-vehicle attribute is above a threshold, wherein the indicator is removed from the display when the temperature difference is below the threshold comfort level.

16. The method for providing the indicator of claim 15, wherein the desired HVAC attribute is a desired in-vehicle temperature and the current in-vehicle attribute is a temperature of air from a HVAC system within the vehicle.

17. The method for providing the indicator of claim 15, wherein the desired HVAC attribute is a desired fan speed and the current in-vehicle attribute is a current fan speed of a HVAC system within the vehicle.

18. The method for providing the indicator of claim 17, wherein the desired fan speed is learned from a user's behavior.

19. The method for providing the indicator of claim 15, wherein the calculating is continuously performed.

* * * * *